March 10, 1942.   F. J. JOHNS   2,276,043
CENTRIFUGAL SWITCH
Filed Feb. 16, 1940   2 Sheets-Sheet 1
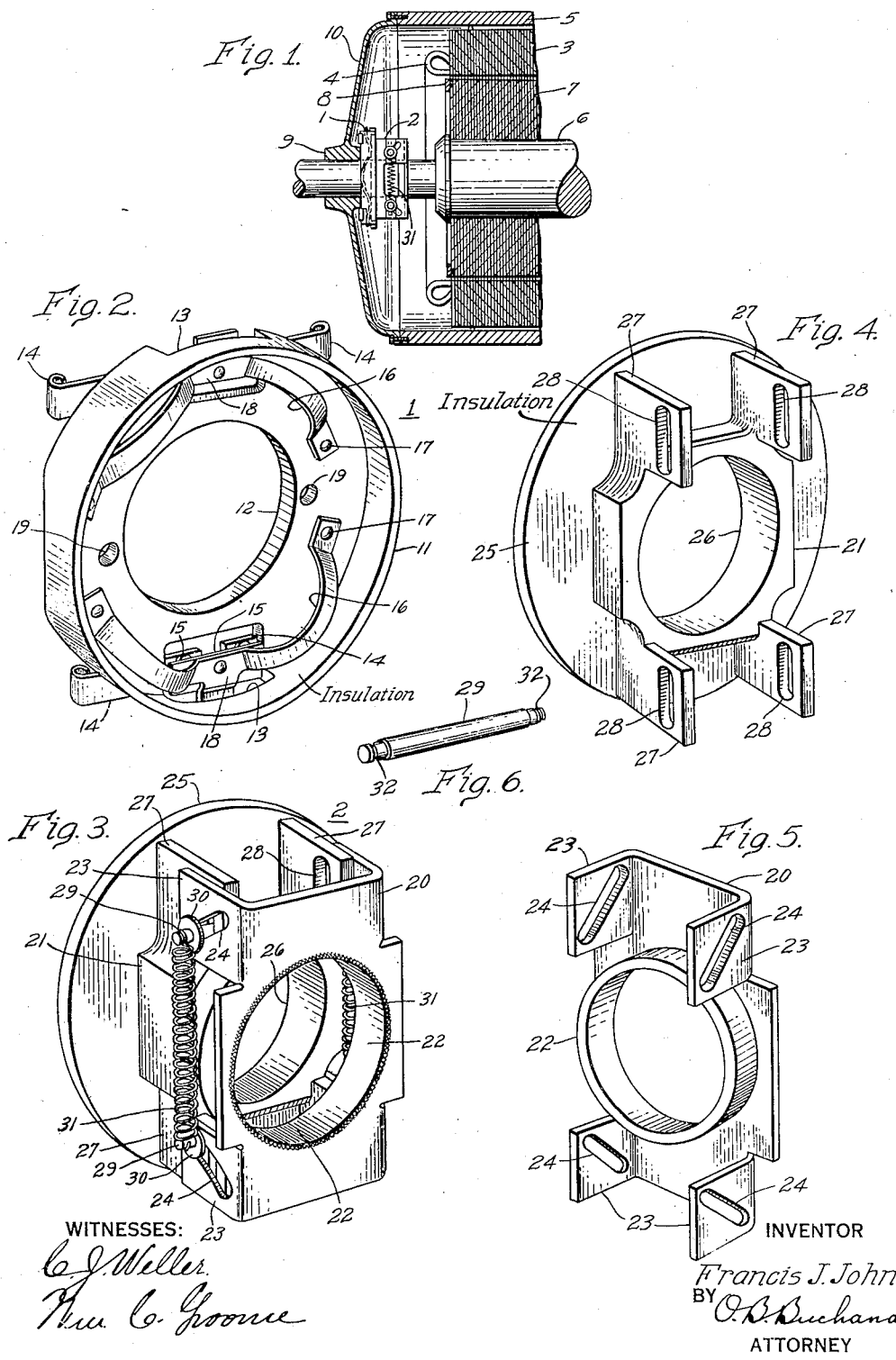
WITNESSES:
C. J. Weller.
Wm. C. Groome
INVENTOR
Francis J. Johns.
BY O. B. Buchanan
ATTORNEY March 10, 1942.  F. J. JOHNS  2,276,043
CENTRIFUGAL SWITCH
Filed Feb. 16, 1940   2 Sheets-Sheet 2

WITNESSES:

INVENTOR
Francis J. Johns.
BY
ATTORNEY

Patented Mar. 10, 1942

2,276,043

UNITED STATES PATENT OFFICE 2,276,043

CENTRIFUGAL SWITCH

Francis J. Johns, Pittsburgh, Pa., assignor to Westinghouse Electric & Manufacturing Company, East Pittsburgh, Pa., a corporation of Pennsylvania Application February 16, 1940, Serial No. 319,232

8 Claims. (Cl. 200—80)

The present invention relates to speed-responsive circuit-interrupting devices, and more particularly to a centrifugal switch which is especially adapted for use with single-phase induction motors for effecting a desired change in the connections of the motor when it reaches a predetermined speed of rotation.

Single-phase induction motors usually have a main or running primary winding, and an auxiliary or starting primary winding which is displaced from the main winding on the frame of the motor. The two windings are connected to the line in parallel, and a phase displacement is produced between the currents in them, either by designing them with different ratios of resistance to reactance, as in the split-phase motor, or by connecting a capacitor in series with the auxiliary winding, as in the capacitor motor. The effect of the displacement of the two windings on the frame and the phase displacement between their currents is to set up a revolving field, so that the necessary starting torque for the motor can be developed. After the motor has reached a speed of from 70% to 80% of synchronous speed, the starting winding is disconnected from the line, or in some types of capacitor motors, a different value of capacitance is connected in the auxiliary winding circuit. This change in connections is made at a predetermined speed by some type of speed-responsive device, which is usually a centrifugal switch. Such a switch is usually designed to open its contacts when the motor reaches the predetermined speed and to remain open until the motor has slowed down to approximately 20% to 30% of synchronous speed.

The object of the present invention is to provide a centrifugal switch which is especially adapted for use with single-phase motors, and which is of very simple and inexpensive construction.

Another object of the invention is to provide a centrifugal switch which is easily assembled and adjusted and which is very reliable and positive in its action.

A further object of the invention is to provide a centrifugal switch which has very high current-interrupting capacity, and which is suitable for use with single-phase induction motors of the higher ratings, such as 1 to 3 horsepower.

Other objects and advantages of the invention will be apparent from the following detailed description, taken in connection with the accompanying drawings, in which:

Figure 1 is a partial longitudinal sectional view of a single-phase motor, showing the switch of the present invention in assembled position;

Fig. 2 is a perspective view showing the stationary member of the switch;

Fig. 3 is a perspective view showing the assembled rotating member;

Fig. 4 is a perspective view showing the movable element of the rotating member;

Fig. 5 is a perspective view showing the fixed element of the rotating member;

Fig. 6 is a perspective view of a weight bar;

Figure 7:
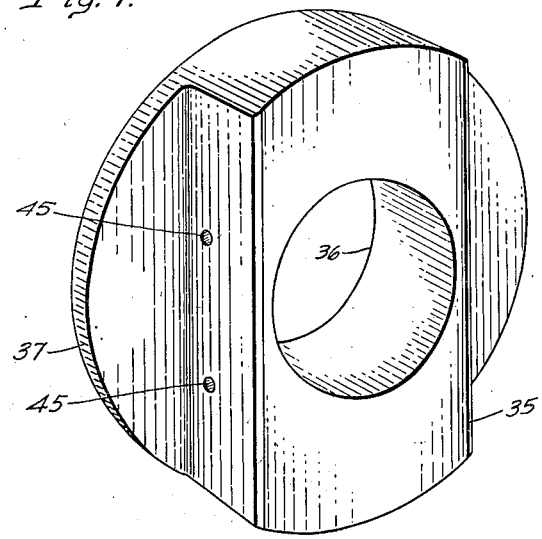
Fig. 7 is a perspective view showing the movable element of a slightly modified form of rotating member.

The switch of the present invention consists essentially of a stationary member, generally indicated at 1, which is adapted to be secured to the end bracket or other stationary part of a motor, and a rotating member, generally indicated at 2, which is adapted to be fixed on the shaft of the motor. The preferred manner of mounting this device in a motor is shown in Fig. 1, which is a partial longitudinal section of a single-phase motor of more or less conventional construction, having a laminated stator core 3 on which the windings 4 are placed, and which is supported in a suitable frame 5. The rotor member is secured on a shaft 6 and has a laminated core 7 on which a suitable winding 8, indicated as a squirrel-cage winding, is placed. The shaft is supported for rotation in a bearing 9 which is mounted in the end bracket 10. The stationary member 1 of the switch is mounted on the inside of the end bracket 10 concentric with the shaft 6, and may be secured to the bearing boss. The rotatable member 2 is secured to the shaft in such a position that it extends into the stationary member 1 when the motor is at rest, as shown in Fig. 1.

The parts of the switch are shown more in detail in Figs. 2 to 6, inclusive. Fig. 2 shows the stationary member 1 which consists of a generally cup-shaped body 11, formed of insulating material, and having a central bore 12 of large enough diameter to permit the shaft of the motor to pass through it with a reasonable clearance. Diametrically opposite portions of the body member 11 are cut away, as indicated at 13. to provide openings extending a considerable distance into the bottom of the cup-shaped body. Two contact strips 14 of brass, or other suitable material, are fastened to the bottom of the body 11 at each side in such a position that their ends extend into the openings 13 and are spaced apart a small distance, as clearly shown in Fig. 2. Contacts 15 of silver, or any suitable contact alloy, are fastened on each of the contact strips 14. A spring member 16 is placed in the body member 11 on each side and secured to it in any suitable manner, as by rivets 17. Each of these spring members 16 has secured to it a movable contact 18 which is in a position to bridge the fixed contacts 15, but which is normally held away from them by the spring. These springs may be of any suitable shape, the shape shown in the drawings being illustrative only, but they should be so arranged that they will normally hold the contacts 18 out of engagement with the fixed contacts 15, but permit them to be moved into engagement with the fixed contacts by the application of pressure to the springs by the rotatable member 2 in the manner to be described hereinafter. As described above, the stationary member 1 is intended to be secured to the motor bracket, or other fixed part of the motor, and for this purpose holes 19 may be provided in the body portion 11 for the reception of mounting screws.

The rotating member 2 of the switch is shown assembled in Fig. 3, and consists of a fixed element or support 20 and a movable element or plunger 21, which is supported on the fixed element 20. The fixed element or support 20 is shown more in detail in Fig. 5. This element is preferably made of sheet steel, or similar material, and has a central annular flange 22 which is adapted to be secured to the shaft of the motor by a press fit or in any other suitable manner. The support 20 is formed with a pair of upstanding ears 23 at each end, and each of these ears 23 has a slot 24 cut in it. The slots 24 are preferably disposed at an acute angle to the axis of the shaft, as clearly shown in Fig. 5.

The movable element or plunger 21 is shown in detail in Fig. 4. This element is preferably molded of a suitable insulating material, and has a circular base portion 25 of a diameter slightly smaller than the inside diameter of the body portion 11 of the stationary member 1. The plunger 21 has a central bore 26 of slightly greater diameter than the shaft of the motor so as to permit the plunger to move freely axially of the shaft, and axially extending ears 27 are formed on the plunger on each side of the bore 26. Each of the ears 27 has a slot 28 formed in it which is perpendicular to the axis of the shaft. The ears 27 are positioned so that they will fit between the ears 23 of the support 20.

The rotatable member 2 is assembled, as shown in Fig. 3, with the plunger 21 fitting between the ears 23 of the support 20 and the two elements are held together by means of weight bars 29. Two of these bars are used, one on each side of the shaft, and they extend through the slots 24 and 28 and are held in position therein by means of washers 30, which are pressed or otherwise secured on the ends of the bars. It will be seen that the position and arrangement of the slots are such that the bars 29 are free to move outwardly away from the shaft under the influence of centrifugal force, and this movement is opposed by helical springs 31 which extend between the ends of the bars 29 at each side of the shaft. These springs are preferably fastened in grooves 32 formed in the ends of the bars, and the two springs should be matched to have approximately the same initial tension.

The operation of the switch is as follows: The switch is mounted in the motor in a position such as shown in Fig. 1, the stationary member 1 being secured to a stationary part of the motor with the shaft 6 extending through the bore 12. The rotating member 2 is placed on the shaft 6 with the support 20 secured to the shaft to rotate with it and the plunger 21 extending into the body portion 11 of the stationary member 1, as shown in Fig. 1 which shows the parts of the switch in their positions when the motor is at rest. In this position, the base 25 of the plunger 21 extends into the stationary member 1 and bears against the springs 16, holding the movable contacts 18 against the fixed contacts 15 to maintain the switch in its closed position. When the motor is started, the rotating member 2 rotates with the shaft with the plunger 21 still bearing against the springs 16. The centrifugal force acting on the weight bars 29 tends to move them outwardly of the shaft, but this movement is restrained by the springs 31 until the motor reaches a predetermined speed, at which time the centrifugal force overcomes the restraining force of the springs, and the bars 29 move outwardly away from the shaft. As will be seen from Fig. 3, this outward movement of the bars is guided by the slots 24 so that the bars move both radially and axially of the shaft, and since they also pass through the slots 28 of the plunger 21, this outward movement of the bars draws the plunger 21 axially of the shaft in a direction away from the stationary member 1. When the plunger 21 is thus withdrawn from the stationary member 1, the springs 16 move the movable contacts 18 away from the fixed contacts 15, thus opening the switch and effecting the desired change in the connections of the motor. It will be obvious that when the motor slows down, the reverse action will take place. When the centrifugal force decreases to a predetermined value, the springs 31 will pull the weight bars 29 inward toward the shaft to the position shown in Fig. 3, and this movement of the bars will move the plunger 21 axially into engagement with the springs 16 to again close the contacts.

Figure 8:
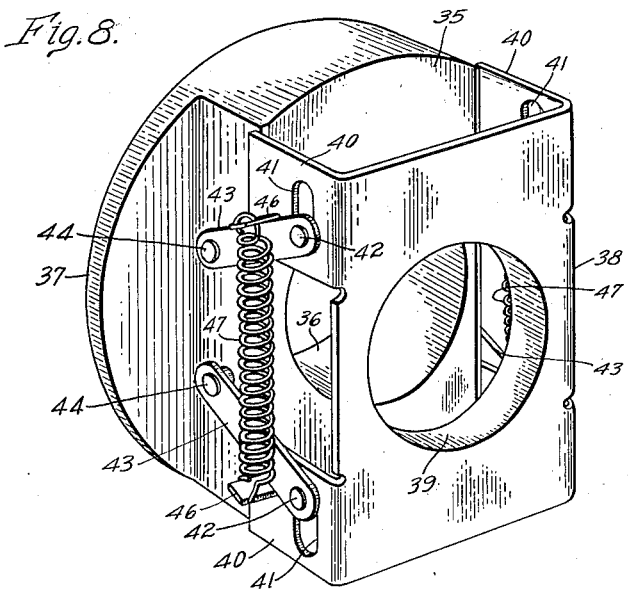
Fig. 8 is a perspective view of an assembled rotating member using the movable element of Fig. 7.

A somewhat modified form of rotating member is shown in Figs. 7 and 8. The movable element or plunger 35 has a central bore 36 of large enough diameter to permit the plunger to move freely on the shaft and a circular base 37 of slightly less diameter than the inside diameter of the body 11 of the stationary member 1. The plunger 35 is supported on a fixed element or support 38 as shown in Fig. 8. The support 38 is generally similar to the support 20 described above and has a central annular flange 39 adapted to be secured on a shaft by a press fit, and ears 40 at each side of the flange 39. The support 38 differs from the support 20 in that the slots 41 in the ears 40 are perpendicular to the axis of the shaft and are positioned near the bottom of the ears. Weight bars 42 extend through the slots 41 of the support 38 at each side of the shaft. These weight bars may be similar to the bars 29 and are free to move outwardly away from the shaft under the influence of centrifugal force. The plunger 35 is connected to the support 38 by means of links 43 which are pivoted at one end on the weight bars 42 and at the other end on studs 44 secured in holes 45 in the plunger 35. Each link 43 has a lug 46 at its mid-point and a helical spring 47 is secured between the lugs 46 on each side of the shaft. The two springs 47 are matched to have approximately the same initial tension.

The operation of this embodiment of the invention will be apparent. When the motor is at rest, the springs 47 hold the bars 42 in the inner ends of the slots 41, as shown in Fig. 8, and the plunger 35 extends into the stationary member 1 to hold the movable contacts 18 against the fixed contacts 15 as previously described. When the motor is started, the bars 42 tend to move outwardly under the influence of centrifugal force but this movement is restrained by the springs 47, acting through the links 43. When the motor reaches a predetermined speed, the centrifugal force overcomes the restraining force of the springs and the bars 42 move outward away from the shaft. The links 43 are pivoted on fixed pivots 44 on the plunger 35 and outward movement of the bars 42 therefore moves the plunger axially, withdrawing it from the stationary member 1 and permitting the contacts to open. When the motor slows down, the springs 47 pull the bars 42 inward when a predetermined speed is reached and thus move the plunger 35 axially into the stationary member 1 to close the contacts. This type of rotating member has the advantage that by properly proportioning the linkage, it can be designed to open the contacts at a relatively high speed and to let them remain open until the motor has slowed down to a very low speed.

It will be seen, therefore, that a centrifugal switch has been provided which is very reliable and positive in its action, and which is of simple and inexpensive construction. The stationary member requires riveting, but is very simple in design and can be easily and quickly produced, while the rotating member requires no riveting or similar operations, and can be very rapidly produced and assembled. The switch has a very high current-interrupting capacity and will safely interrupt currents as high as 120 amperes, making it suitable for use with the largest sizes of single-phase motors and for similar heavy-duty applications.

It will be understood that various changes in design may be made without departing from the spirit of the invention. In the rotating member of Figs. 3 to 5, the slots 24 of the support 20 may be shaped so as to give the switch any desired type of operation. Thus, they may be shaped so that after the switch has opened at a given speed, it will remain open until the motor has slowed down to a much lower speed, which is usually desirable. The slots may also readily be shaped so as to make the switch open with a snap action, which is sometimes desirable. Similarly, the linkage of the rotating member of Figs. 7 and 8 may be modified to make the switch operate in any desired manner. The switch is easily adjusted to cause it to operate at the desired speed by initially adjusting the tension of the springs 31 or 47, which determines the speed at which the switch will operate.

It is to be understood, therefore, that although certain specific embodiments of the invention have been shown for the purpose of illustration, it is not limited to the exact structure shown and described, but in its broadest aspects it includes all equivalent embodiments and modifications which come within the scope of the appended claims.

I claim as my invention:

1. A centrifugal switch comprising a stationary member having a pair of contacts thereon, means on the stationary member for biasing the contacts to the open position, a rotatable member including a fixed element adapted to be secured on a shaft for rotation therewith and a movable element supported on the fixed element and movable axially of the shaft, said movable element being in engagement with the stationary member when the shaft is at rest to hold the contacts closed, and a pair of weight bars extending through slots in both the fixed and movable elements, said slots being arranged to permit the bars to move outwardly of the shaft under the influence of centrifugal force and the slots in the fixed element being disposed to cause the movable element to be moved away from the stationary member by outward movement of the bars.

2. A centrifugal switch comprising a stationary member having a pair of contacts thereon, means on the stationary member for biasing the contacts to the open position, a rotatable member including a fixed element adapted to be secured on a shaft for rotation therewith and a movable element supported on the fixed element and movable axially of the shaft, said movable element being in engagement with the stationary member when the shaft is at rest to hold the contacts closed, a pair of weight bars extending through slots in both the fixed and movable elements, said slots being arranged to permit the bars to move outwardly of the shaft under the influence of centrifugal force and the slots in the fixed element being disposed to cause the movable element to be moved away from the stationary member by outward movement of the bars, and spring means opposing outward movement of the weight bars.

3. A centrifugal switch comprising a stationary member having a pair of contacts thereon, means on the stationary member for biasing the contacts to the open position, a rotatable member including a fixed element adapted to be secured on a shaft for rotation therewith and a movable element supported on the fixed element and movable axially of the shaft, said movable element being in engagement with the stationary member when the shaft is at rest to hold the contacts closed, a pair of weight bars supported in the fixed element and movable outwardly of the shaft under the influence of centrifugal force, links connecting the weight bars to the movable element, said links being so arranged that outward movement of the weight bars causes the movable element to be moved away from the stationary member, and spring means opposing outward movement of the weight bars.

4. A speed-responsive circuit-interrupting device comprising a stationary member and a rotatable member, said stationary member having a fixed contact and a movable contact thereon, means on the stationary member for biasing said contacts to the open position, said rotatable member having a fixed element adapted to be secured on a shaft for rotation therewith and a movable element movable axially of the shaft, said movable element engaging the stationary member when the shaft is at rest to hold the contacts closed against the action of the biasing means, a pair of weight bars on the fixed element, said weight bars being disposed in slots in the fixed element and guided by said slots for movement outwardly of the shaft under the influence of centrifugal force, and spring means opposing outward movement of the weight bars, said weight bars being connected to the movable element so that outward movement of the weight bars causes the movable element to move away from the stationary member.

5. A speed-responsive circuit-interrupting device comprising a stationary member and a rotatable member, said stationary member having a fixed contact and a movable contact thereon, means on the stationary member for biasing said contacts to the open position, said rotatable member having a fixed element adapted to be secured on a shaft for rotation therewith and a movable element movable axially of the shaft, said movable element engaging the stationary member when the shaft is at rest to hold the contacts closed against the action of the biasing means, said fixed element having portions extending parallel to the shaft, said portions having slots therein, weight bars disposed in said slots and guided thereby for movement both radially and axially of the shaft under the influence of centrifugal force, and spring means opposing radial outward movement of the weight bars, said weight bars also passing through slots in the movable element, said last-mentioned slots extending radially of the shaft, so that movement of the weight bars outwardly of the shaft moves the movable element axially away from the stationary member.

6. A speed-responsive circuit-interrupting device comprising a stationary member and a rotatable member, said stationary member having a fixed contact and a movable contact thereon, means on the stationary member for biasing said contacts to the open position, said rotatable member having a fixed element adapted to be secured on a shaft for rotation therewith and a movable element movable axially of the shaft, said movable element engaging the stationary member when the shaft is at rest to hold the contacts closed against the action of the biasing means, said fixed element having portions extending parallel to the shaft, said portions having slots therein, and weight bars disposed in said slots and guided thereby for movement outwardly of the shaft under the influence of centrifugal force, spring means opposing outward movement of the weight bars, and links connecting the weight bars to the movable element to cause it to move axially away from the stationary member when the weight bars move outwardly.

7. In a speed-responsive switch, a centrifugal device comprising a fixed element adapted to be fixed on a shaft for rotation therewith, a movable element carried by said fixed element and movable axially of the shaft, a pair of weights supported in the fixed element for movement radially outward from the shaft under the influence of centrifugal force when the shaft reaches a predetermined speed of rotation, said weights extending through slots in the fixed element which guide the weights in their outward movement, and means connecting the weights to said movable element to effect axial movement of the movable element when the weights move radially.

8. In a speed-responsive switch, a centrifugal device comprising a fixed element adapted to be fixed on a shaft for rotation therewith, a movable element carried by said fixed element and movable axially of the shaft, a pair of weights supported in the fixed element for movement radially outward from the shaft, spring means opposing outward movement of the weights, said weights extending through slots in the fixed element which guide the weights in their outward movement, and means on the movable element connecting it to the weights and adapted to effect axial movement of the movable element when the weights move radially.

FRANCIS J. JOHNS.